(12) United States Patent
Kraft

(10) Patent No.: US 9,760,922 B2
(45) Date of Patent: Sep. 12, 2017

(54) MONETIZATION OF INTERACTIVE NETWORK-BASED INFORMATION OBJECTS

(75) Inventor: Reiner Kraft, Gilroy, CA (US)

(73) Assignee: EXCALIBUR IP, LLC, Sunnyvale, CA (US)

(*) Notice: Subject to any disclaimer, the term of this patent is extended or adjusted under 35 U.S.C. 154(b) by 124 days.

(21) Appl. No.: 12/556,911

(22) Filed: Sep. 10, 2009

(65) Prior Publication Data

US 2011/0060667 A1 Mar. 10, 2011

(51) Int. Cl.
*G06Q 30/06* (2012.01)
*G06Q 30/02* (2012.01)

(52) U.S. Cl.
CPC ..... *G06Q 30/0603* (2013.01); *G06Q 30/0255* (2013.01); *G06Q 30/0613* (2013.01); *G06Q 30/0643* (2013.01)

(58) Field of Classification Search
CPC ...... G06Q 30/00; G06Q 30/06; G06Q 10/087; G06Q 30/02; G06Q 30/0641; G06Q 30/0275
USPC .............. 705/26.1, 26.3, 14, 35, 27.1, 14.71
See application file for complete search history.

(56) References Cited

U.S. PATENT DOCUMENTS

| 7,263,526 B1 | 8/2007 | Busey |
| 2001/0047308 A1 | 11/2001 | Kaminsky et al. |
| 2003/0041004 A1 | 2/2003 | Parry et al. |
| 2004/0205132 A1* | 10/2004 | Czerwonka .................. 709/205 |
| 2005/0187818 A1 | 8/2005 | Zito et al. |
| 2007/0073585 A1* | 3/2007 | Apple .................... G06Q 30/02 705/14.46 |
| 2007/0192279 A1* | 8/2007 | Van Luchene ....... G06Q 10/087 |
| 2008/0167943 A1 | 7/2008 | O'Neil et al. |
| 2008/0201667 A1* | 8/2008 | Drayer ................. G06F 3/0481 715/854 |
| 2008/0244038 A1 | 10/2008 | Martinez |

(Continued)

FOREIGN PATENT DOCUMENTS

| CN | 101344958 A | 1/2001 |
| JP | 2001195494 A | 7/2001 |

(Continued)

OTHER PUBLICATIONS

Unpublished U.S. Appl. No. 11/058,477, filed Feb. 14, 2005, 49 pages.

(Continued)

*Primary Examiner* — Mila Airapetian
(74) *Attorney, Agent, or Firm* — Pillsbury Winthrop Shaw Pittman LLP

(57) ABSTRACT

An information objects is defined that is representative of a real-world entity (e.g., a product or a service). The information object may be stored in a data store. The information object has an associated owner. A communication channel is associated with the information object that is configurable to route communications to a manager assigned to the information object. A party is enabled to obtain management of the information object for a time period. The communication channel is configured to route to the party requests that are made by interacting with the information object during the time period. A plurality of users is enabled to interact with the information object during the time period to input requests to the party over the communication channel.

13 Claims, 8 Drawing Sheets

(56) References Cited

U.S. PATENT DOCUMENTS

2009/0106307 A1* 4/2009 Spivack .................. G06Q 30/02
2009/0144124 A1 6/2009 Surendran et al.
2009/0177745 A1 7/2009 Davis et al.

FOREIGN PATENT DOCUMENTS

| WO | 2007/034236 |    | 3/2007 |
| --- | --- | --- | --- |
| WO | 2008103933 | A2 | 8/2008 |
| WO | 2011/031408 | A2 | 3/2011 |
| WO | 2011/031408 | A3 | 6/2011 |

OTHER PUBLICATIONS

International Search Report and Written Opinion received for PCT Application No. PCT/US2010/045319, mailed on Apr. 28, 2011, 9 pages.
European Search Report dated Apr. 13, 2013 corresponding to European Serial No. 10815806.4.
Japanese Patent Office Action dated May 29, 2013 corresponding to Japanese Serial No. 2012-527892.
Office Action issued on Oct. 15, 2013 in Taiwanese Application No. 99129645.
Office Action issued on Mar. 20, 2014 in Taiwanese Application No. 99129645.
Office Action issued on Apr. 3, 2014 in Chinese Application No. 201080039309.1.
Office Action issued on Jun. 9, 2015 in Chinese Application No. 201080039309.1.
Office Action issued on Jun. 14, 2016 in Chinese Application No. 201080039309.1.
Office Action issued on Dec. 14, 2015 in Chinese Application No. 201080039309.1.
Extended European Search Report dated Mar. 9, 2016 in European Application 16152042.4.
Office Action issued Feb. 14, 2017 in European Application No. 16152042.4.

* cited by examiner

MONETIZATION OF INTERACTIVE NETWORK-BASED INFORMATION OBJECTS

BACKGROUND OF THE INVENTION

Field of the Invention

The present invention relates to the display and monetization of information objects in online pages.

Background

The Internet is a system of interconnected computer networks that interconnects users all around the world. The World Wide Web (Web) is a decentralized global collection of interlinked information that is accessible over the Internet. Information is generally made available on the Web in the form of "web pages" that may contain text, images, and/or media content. Through the contributions of countless users, the Web has grown to become a vast, decentralized treasure trove of information.

The Internet and the Web have enabled many advances in advertising and electronic commerce (the buying and selling of products or services over networks). The amount of commerce conducted electronically has grown extraordinarily with widespread Internet usage. Commercial products are bought and sold over the Internet in increasingly greater amounts. For example, an interactive online object may represent a product for sale by an "owner" who provides the online object. A user may interact with the online object to purchase a physical instance of the product from the owner. However, such techniques do not fully leverage the potential of online objects for enhancing electronic commerce. As a result, less revenue may be generated by sellers of products and services than is possible.

BRIEF SUMMARY OF THE INVENTION

Techniques for monetizing online information objects are provided herein. An information object may be associated with a real-world entity, such as a product or service. A party is enabled to manage the online information objects for a period of time, in return for compensation to an owner that provides the information object. When managing an information object, the managing party may monetize the information object in any manner, including by selling the products and/or services associated with information object to users. Furthermore, the information object is configured to have a communication channel that routes communications from users that interact with the information object to the managing party. In this manner, the users may ask questions or communicate with the managing party for any other purpose related to the information object, which may increase opportunities for the managing party to monetize the information object with respect to the users.

In one implementation, a method is provided. An information object is defined that is representative of a real-world entity. The information object may be stored in a data store, for example (e.g., in a library of information objects). The information object has an associated owner. A communication channel is associated with the information object that is configurable to route communications to a manager assigned to the information object. A party is enabled to obtain management of the information object for a time period. The communication channel is configured to route to the party requests that are made by interacting with the information object during the time period. A plurality of users is enabled to interact with the information object during the time period to input requests to the party over the communication channel.

In another implementation, an information object management system is provided. The information object management system includes an object builder module and an information object allocator. The object builder module is configured to enable an information object representative of a real-world entity to be defined, and to associate a communication channel with the information object. The communication channel is configurable to route communications to a manager assigned to the information object. The information object allocator is configured to enable a party to obtain management of the information object for a time period, and to configure the communication channel to route requests to the party that are made by interacting with the information object during the time period.

Computer program products are also described herein. The computer program products include a computer-readable medium having computer program logic recorded thereon for enabling management of information objects to be provided to parties, for enabling monetization of the information objects by the parties, and for enabling further embodiments, according to the implementations described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
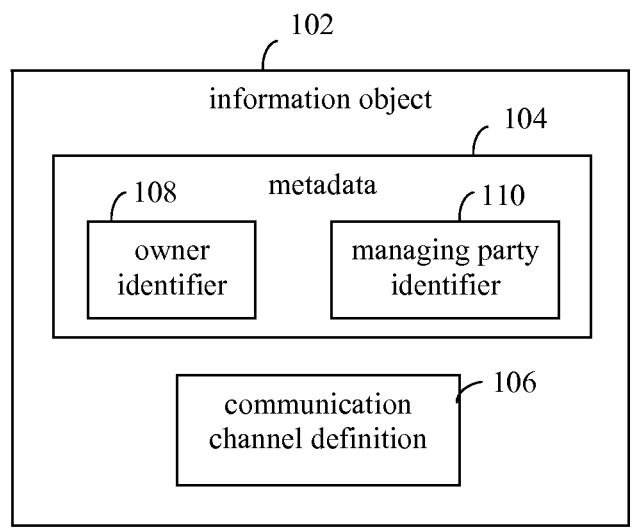
FIG. 1 shows a block diagram of an information object, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments

Embodiments of the present invention are related to interactive online information objects. Interactive online information objects are provided that may be managed for various periods of time by various parties. In an embodiment, a party may be enabled to monetize an information object over a time period that the party is assigned to manage the information object.

For example, FIG. 1 shows a block diagram of an information object 102, according to an embodiment. Information object 102 is an interactive online information object or model that corresponds to an entity in the real world, such as a product or service that may be sold. Information object 102 may have an associated owner (e.g., an individual, a company, etc.) that generates, provides, and/or causes information object 102 to be provided. As shown in FIG. 1, information object 102 includes metadata 104 and a communication channel definition 106. Metadata 104 includes data that is descriptive of information object 102. Communication channel definition 106 defines a configurable communication channel associated with information object 102. The communication channel may be configured to route communications from users that interact with information object 102 to a party that is selected to manage information object 102 for a period of time. Each time that information object 102 is reassigned from a current managing party to a subsequent managing party, the communication channel may be reconfigured to route communications to the subsequent managing party.

For example, in an embodiment, metadata 104 may include an owner identifier 108 and a managing party identifier 110. When present, owner identifier 108 may be an identifier for an owner of information object, and managing party identifier 110 may be an identifier for a party that is selected/assigned to manage information object 102. For instance, owner identifier 108 and managing party identifier 110 may each be a unique identification number, name, and/or any other identifier configured to respectively identify the owner or managing party. Communication channel definition 106 defines a communication channel that is configured to route communications from users that interact with information object 102 to the managing party identified by managing party identifier 110. For example, communication channel definition 106 may include a definition for one or more modes of communication, including a hyperlink (e.g., a uniform resource locator (URL) to a destination web page), a text-based communication mode such as email, instant messaging, and chat, etc. The communication channel may be configured to route communications from users to the identified managing party using the communication channel type defined by communication channel definition 106.

Figure 2:
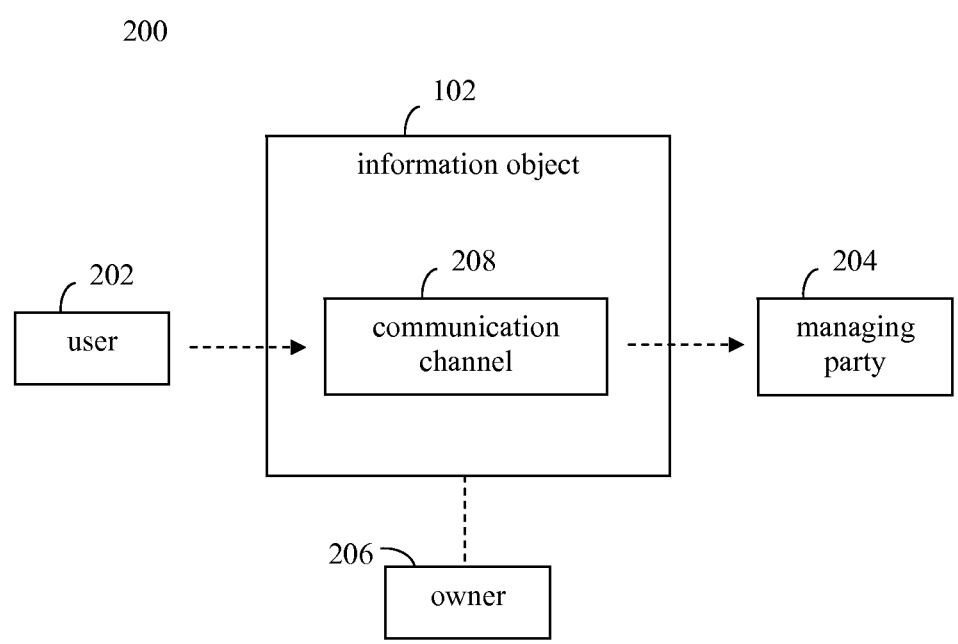
FIG. 2 shows an information object interaction environment, according to an example embodiment.

Users, owners, and managing parties may interact with information object 102 in any manner. For instance, FIG. 2 shows an information object interaction environment 200, according to an example embodiment. As shown in FIG. 2, environment 200 includes information object 102, a user 202, a managing party 204, and an owner 206. Managing party 204 is a party (e.g., a person, a company, or other entity) selected to manage information object 102 for a time period, and is identified by managing party identifier 110. Owner 206 is an owner (e.g., a person, a company, or other entity) of information object 102 that allows managing party 204 to manage information object 102 for a time period, and is identified by owner identifier 108. User 202 interacts with information object 102. For example, user 202 may view information object 102, may desire information regarding the product or service represented by information object 102, may desire to purchase the product or service represented by information object 102, etc. As shown in FIG. 2, information object 102 has an associated communication channel 208. Communication channel 208 is a communication channel that is defined by communication channel definition 106, and enables user 202 and/or further users to communicate with managing party 204. User 202 may interact with information object 102 to request information, to ask questions, to purchase the associated product or service, etc., by communicating with managing party 204 using communication channel 208.

Figure 3:
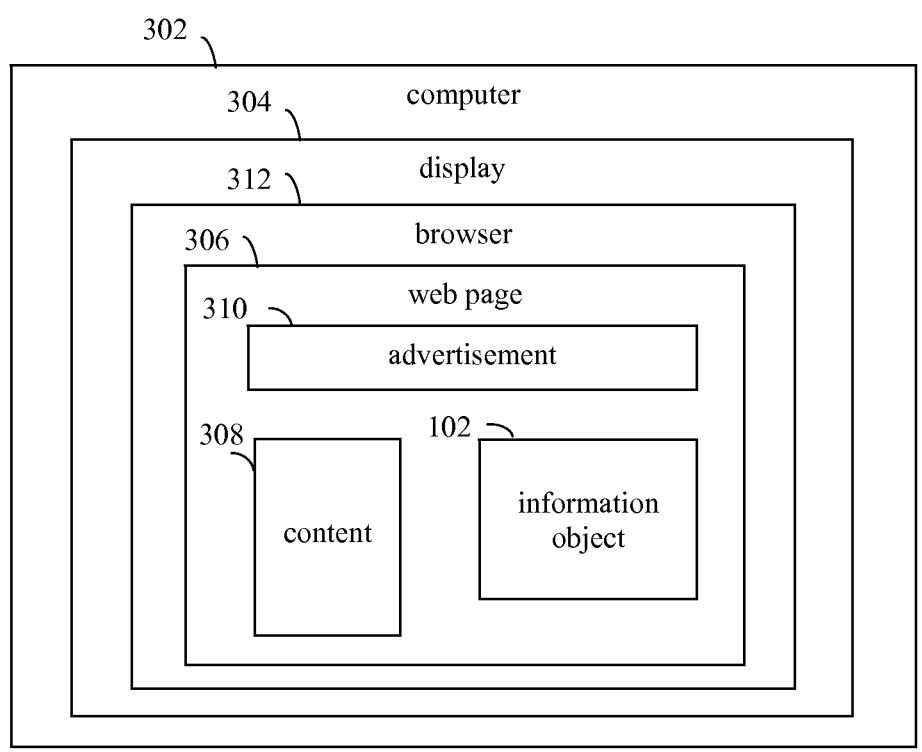
FIG. 3 shows a block diagram of a computer used to display and interact with an information object, according to an example embodiment.

Information object 102 may be made accessible to user 202 and further users in various ways. For instance, FIG. 3 shows a block diagram of a computer 302 used to interact with information object 102, according to an example embodiment. Computer 302 is a computer of a user, such as user 202 of FIG. 2. As shown in FIG. 3, computer 302 has a display 304 that displays a web page 306. For example, web page 306 may be open in a window of a web browser 312. Web browser 312 may be any type of browsing application, including Microsoft Internet Explorer™, Netscape Navigator™, Mozilla™ Firefox, Google Chrome™, Opera Software Opera™, a WAP (wireless application protocol)-enabled browser in the case of a cell phone, PDA (personal digital assistant), or other wireless mobile device, etc.

The user may cause web page 306 to be displayed in any manner, including by navigating to web page 306 according to a URL address for web page 306, causing web page 306 to appear as the result of a search performed using a search engine, etc. A user may use computer 302 to view information object 102 and other content included in web page 306, such as content 308. Content 308 is optionally present, and may be selected by a developer or other entity associated with web page 306 to be included in web page 306. Furthermore, web page 306 may optionally include any number and arrangement of advertisements (or no advertisements), including advertisement 310. Web page 306 may have any arrangement of content, advertisements, and/or information object 102.

The user may interact with information object 102 in web page 306, including by communicating with the managing party for information object 102 using the communication channel defined for information object 102, and made available in web page 360 (e.g., communication channel 208). Information object 102 may include any one or more of text, images (e.g., GIF file images, JPG file images, etc), video (e.g., MPEG file videos, etc.), audio (e.g., WAV file audio, etc.), multi-media objects (e.g., a .SWF file), etc. In embodiments, information object 102 may include one or more files containing programming language code and/or scripting language code to enable its functions, such as C, C++, HTML (hypertext markup language), XML (extensible markup language), Java, JavaScript, VBScript, etc.

Figure 4:
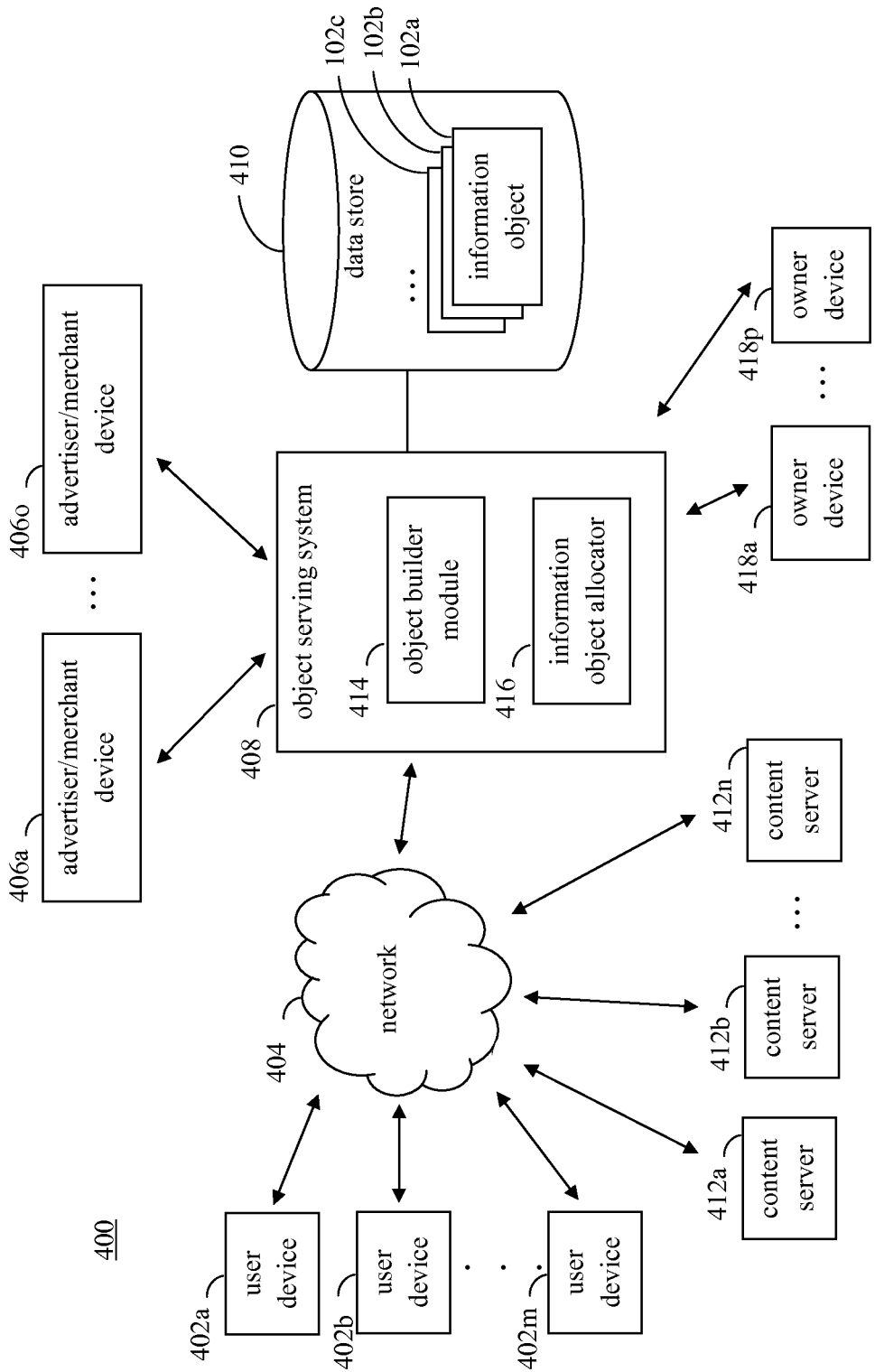
FIG. 4 shows a communication system in which information objects are provided, according to an example embodiment.

Environment 200 of FIG. 2 may be implemented in various ways. For instance, FIG. 4 shows a block diagram of a communication network or system 400 in which information objects are provided, according to an example embodiment. As shown in FIG. 4, system 400 includes a plurality of user devices 402a-402m, a network 404, a plurality of advertiser/merchant devices 406a-406o, an object serving system 408, a data store 410, a plurality of content servers 412a-412n, and a plurality of owner devices 418a-418p. These elements of system 400 are described as follows.

As shown in FIG. 4, data store 410 is coupled to object serving system 408. User devices 402a-402m, content servers 412a-412n, and object serving system 408 are communicatively together by network 404. Network 404 may be any type of communication network, including a local area network (LAN), a wide area network (WAN), or a combination of networks, such as the Internet. User devices 402 may each be any type of electronic device that may be configured with network browsing functionality, including a desktop computer (e.g., a personal computer, etc.), a mobile computing device (e.g., a cell phone, smart phone, a personal digital assistant (PDA), a laptop computer, a notebook computer, etc.), or a mobile email device (e.g., a RIM Blackberry® device). Data store 410 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Communication system 400 enables information objects to be generated and/or provided by owners and to be assigned to parties for management for periods of time. As shown in FIG. 4, object serving system 408 maintains data store 410, which stores a plurality of information objects 102a-102c. Any number of information objects 102 may be stored in data store 410, including tens, thousands, and even larger numbers of information objects 102. As shown in FIG. 4, object serving system 408 includes an object builder module 414 and an information object allocator 416. Object builder module 414 enables owners to update information objects 102 in data store 410, including enabling owners to create, delete, and/or modify information objects 102. For example, owners associated with owner devices 418a-418p may access object builder module 414 to generate, delete, modify, and/or provide information objects 102. As shown in FIG. 4, owner devices 418a-418p may be communicatively coupled directly with object serving system 408. Alternatively, owner devices 418a-418p may be communicatively coupled with object serving system 408 through network 404 or in other manner.

Information object allocator 416 enables users and/or parties to search data store 410 for information objects 102 that match their criteria. For instance, advertisers and/or merchants may desire to manage particular information objects 102 in data store 410 in order to have the opportunity to monetize the particular information objects 102. The advertisers and/or merchants may use corresponding advertiser/merchant devices 406a-406o to search data store 410 for information objects 102 meeting their desired criteria. Information object allocator 416 may be configured to enable advertisers/merchants at advertiser/merchant devices 406a-406o to obtain management of desired information objects 102 for periods of time. As shown in FIG. 4, advertiser/merchant devices 406a-406o may be communicatively coupled directly with object serving system 408. Alternatively, advertiser/merchant devices 406a-406o may be communicatively coupled with object serving system 408 through network 404 or in other manner.

Furthermore, users at user devices 402a-402m may desire to interact with information objects 102. Users at user devices 402a-402m may be enabled to access information objects 102a-102c in data store 410 and/or at other locations, such as at websites provided by content servers 412a-412n. For example, content servers 412a-412n may each be configured to host a website so that the website is accessible to users of user devices 402a-402m through network 404. A user may access such websites using a web browser or other web client installed on a corresponding user device 402 accessible to the user. For instance, each of user devices 402a-402m may execute a web browser, such as described above, that enables a user to visit any of the websites hosted by content servers 412a-412n. Communication between user devices 402a-402m and content servers 412a-412n may be carried out using well-known network communication protocols. One or more of information objects 102a-102c may be displayed on web pages hosted by content servers 412a-412n so that users of user devices 402a-402m may interact with them, as described herein.

Embodiments may be implemented in system 400 and/or other communication systems/networks. Further description of an example of communication system 400 (referred to as an "information retrieval and communication network") is provided in co-owned, pending U.S. application Ser. No. 11/058,477, titled "World Modeling Using a Relationship Network with Communication Channels to Entities," which is incorporated by reference herein in its entirety.

Figure 5:
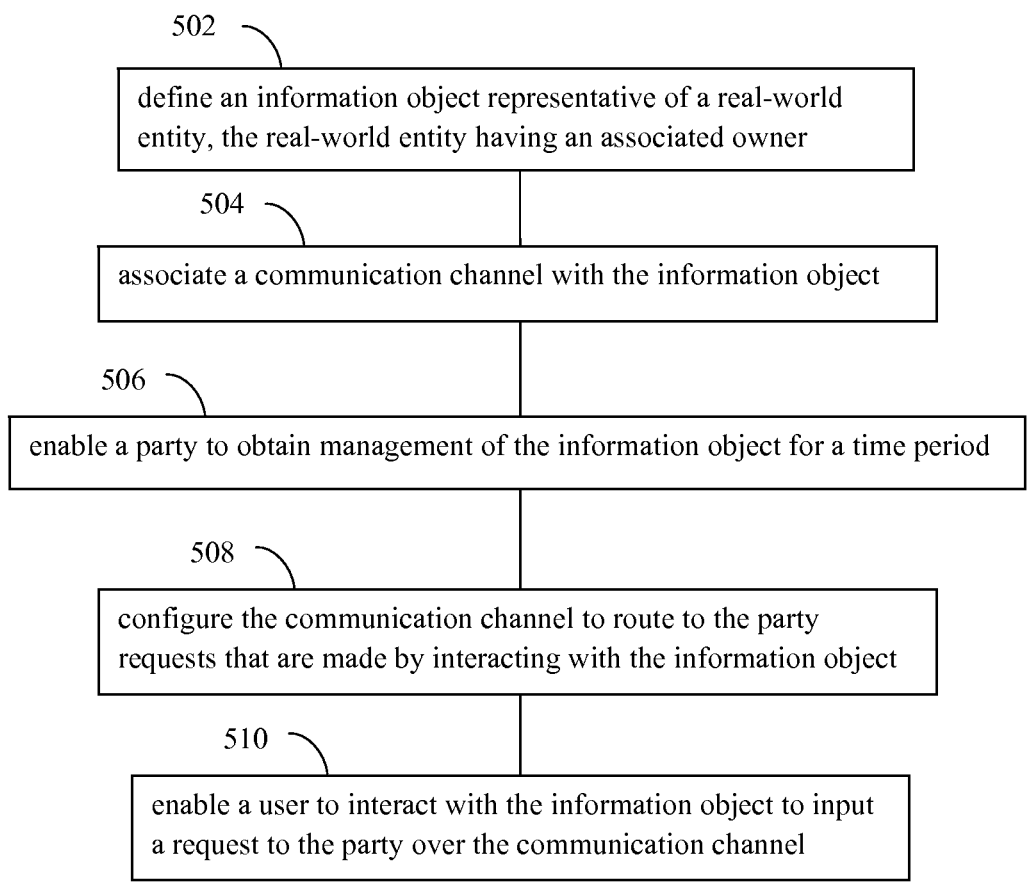
FIG. 5 shows a flowchart for managing information objects, according to an example embodiment of the present invention.

System 400 of FIG. 4 is further described as follows with respect to FIG. 5. FIG. 5 shows a flowchart 500 for managing information objects, according to an example embodiment. System 400 may operate according to flowchart 500, for example. Further structural and operational embodiments will be apparent to persons skilled in the relevant art(s) based on the discussion regarding flowchart 500. Flowchart 500 is described as follows.

Flowchart 500 begins with step 502. In step 502, an information object representative of a real-world entity is defined, the real-world entity having an associated owner. For example, in an embodiment, object builder module 414 may be configured to enable information object 102, which is representative of a real-world entity, to be configured. For instance, information object 102 may be generated or modified using object builder module 414 by an owner of the real-world entity. As described above, the real-world entity may be any product or service, such as a consumer good, a manufactured good, a financial service, an entertainment service, etc. Although shown included in object serving system 408, object builder module 414 may be implemented in an alternative location, such as in an owner device 418.

Figure 6:
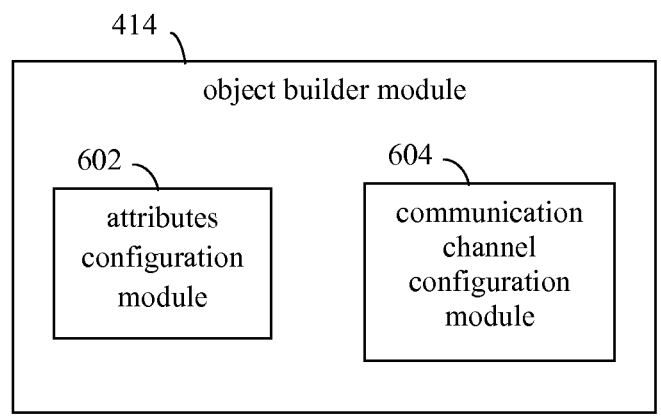
FIG. 6 shows a block diagram of an object builder module, according to an example embodiment.

Object builder module 414 may be configured in various ways. For instance, FIG. 6 shows a block diagram of object builder module 414, according to an example embodiment. As shown in FIG. 6, object builder module 414 includes an attributes configuration module 602 and a communication channel configuration module 604. Attributes configuration module 602 is configured to enable information objects to be defined. For example, in an embodiment, attributes configuration module 602 may generate a user interface (e.g., a graphical user interface) that an owner at an owner device 418 may use to configure an information object 102 by inputting data, such as metadata 104 of FIG. 1, that is descriptive of the information object 102. For example, attributes configuration module 602 may enable the user to indicate one or more of text, images (e.g., GIF file images, JPG file images, etc), video (e.g., MPEG file videos, etc.), and/or audio (e.g., WAV file audio, etc.) to be displayed/played when the information object 102 is displayed in a web page.

For instance, attributes configuration module 602 may enable the user to indicate one or more of a name, a category label, a unique object identifier (ID), owner identifier 108 (FIG. 1), managing party identifier 110, and/or any other descriptive information as metadata 104 for information object 102. When present, the name may be understandable to a human user and specific to the information object 102 being modeled (e.g., "Joe's Restaurant," "Kannon Camera Model XJ5," etc.). The category label may denote the type of real-world object that entity model 400 represents. The object ID, which may or may not be understandable to a human user, is assigned to be unique to each information object 102 in data store 410. In one embodiment, the object ID may automatically generated by object builder module 414 when information object 102 is created and/or added. Owner identifier 108 and managing party identifier 110 may be configured as described above. Note that managing party identifier 110 may include one or more of an email address, phone number, text messaging address, instant messaging address, chat address, a hyperlink, etc., associated with the managing party (e.g., managing party 204 of FIG. 2) that is assigned to information object 102. The communication channel defined by communication channel definition 106 may use the email address, phone number, text messaging address, instant messaging address, chat address, etc., to route communications to the managing party.

Further examples of information objects 102 (referred to as "object models") are described in co-owned, pending U.S. application Ser. No. 11/058,477, referenced above. Attributes configuration module 602 may generate information object 102 as one or more files, such as a .SWF file, an HTML file, an XML file, a Java file, a JavaScript file, a VBScript file, etc.

Referring back to FIG. 5, in step 504, a communication channel is associated with the information object. For example, in an embodiment, object builder module 414 may be configured to associate a communication channel with information object 102. As described above, the communication channel (e.g., communication channel 208 of FIG. 2) is used to route communications from users (e.g., user 202) to the managing party (e.g., managing party 204) assigned to the information object 102.

For instance, referring to FIG. 6, communication channel configuration module 604 may be used to associate a communication channel with information object 102. In an embodiment, communication channel configuration module 604 may generate a user interface (e.g., a graphical user interface) with which an owner at an owner device 418 can interact to select a communication channel type to associate with information object 102. Communication channel configuration module 604 may enable the owner to select one or more of a variety of communication channel types, including hyperlinking, a text-based communication channel type such as email (e.g., simple mail transfer protocol (SMTP)), text messaging (e.g., SMS (short message service)), instant messaging, or chat, etc., to route communications to the managing party. Communication channel configuration module 604 may be configured to include the selected communication channel type(s) in communication channel definition 106, which is included in information object 102.

In step 506, a party is enabled to obtain management of the information object for a time period. For example, in an embodiment, information object allocator 416 may be configured to enable a party (e.g., managing party 204 of FIG. 2) to obtain management of information object 102 for a time period. The time period may be a predetermined time period (e.g., set by the owner of information object 102) or may be designated by the party in a request for management of information object 102. The party may obtain management of information object 102 for a time period in exchange for compensation to the owner (e.g., owner 206). For example, the party may pay money or provide other consideration to the owner for being provided with the opportunity to manage information object 102.

In step 508, the communication channel is configured to route to the party requests that are made by interacting with the information object. For example, in an embodiment, information object allocator 416 may be configured to configure the information object so that communications from users that interact with the information object are routed to the managing party. For instance, in an embodiment, information object allocator 416 may request the particular information object 102 from data store 410, and may include a communication address (e.g., an email address, text messaging address, instant messaging address, chat address, a hyperlink, etc.) for the managing party in the information object 102.

In step 510, a user is enabled to interact with the information object to input a request to the party over the communication channel. For example, in an embodiment, object serving system 408 may enable users to interact with the information object. For instance, object serving system 408 may provide the information object to be displayed on a web page, such as a web page provided by one or more content servers 412a-412n. The display of the information object may include one or more user interface elements that enable users to input requests to the managing party over the communication channel. For instance, an interface for the communication channel (e.g., a text entry box, etc.) may be displayed when the information object is displayed, to enable users to enter communications that are routed to the managing party.

Figure 7:
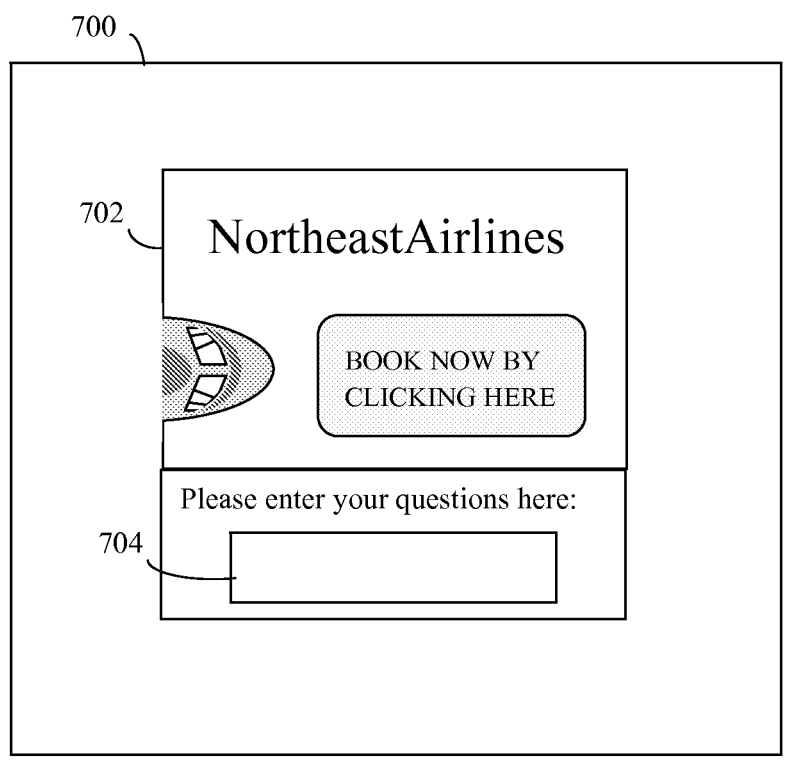
FIG. 7 shows a display of an information object, according to an example embodiment.

For instance, FIG. 7 shows a display of an information object 702, according to an example embodiment. Information object 702 is an example graphical representation of an information object 102 stored in data store 410 that may be displayed in an online location, such as a web page 700. As shown in FIG. 7, information object 702 may include graphical and/or textual features defined by metadata 104. In the example of FIG. 7, the metadata 104 includes the text "NortheastAirlines," an image of the top view of the nose of an aircraft, a rectangle with rounded corners that encloses the text "BOOK NOW BY CLICKING HERE," the text "Please enter your questions here:", which are displayed in information object 702.

Information object 702 is configured such that a user may interact with information object 702 to input a request to the managing party over the communication channel associated with information object 702. For instance, a text entry box 704 is provided as an interface to communicate with the managing party according to the communication channel defined for information object 702. Text entry box 704 enables a user to input a textual message (e.g., a question) that is transmitted to the managing party over the communication channel (communication channel 208 of FIG. 2) defined for information object 702 (e.g., by communication channel definition 106). For example, a user may enter a textual request into text entry box 704, which is transmitted to the managing party according to any suitable communication protocol or technique, such as by an email application, a text messaging application, an instant messaging application, a chat application, etc. Furthermore, a user may select (e.g., click on) the rectangle including the text "BOOK NOW BY CLICKING HERE" to follow a link (e.g., a URL) associated with the rectangle to a web page associated with the managing party. The web page may be configured to perform any function, including enable the user to purchase the real-world entity (e.g., product or service) represented by the information object 702 from the managing party.

Note that the number, form, and arrangement of the features of information object 702 shown in FIG. 7 are provided for purposes of illustration, and are not intended to be limiting. Any number, form, and arrangement of features may be present in information objects, as would be known to persons skilled in the relevant art(s).

In this manner, a party may be selected to obtain management of an information object for a time period. Furthermore, in this manner, subsequent parties may be enabled to obtain management of the information object for subsequent time periods. For instance, a first party may obtain management of the information for a first time period. A second party may be enabled to obtain management of the information object for a second time period subsequent to the first time period. A third party may be enabled to obtain management of the information for a third period subsequent to the second time period, etc. In each case, the communication channel may be configured, as described above, to route to the managing party requests that are made by interacting with the information object during the corresponding time period.

III. Example Information Object Allocator Embodiments

Figure 8:
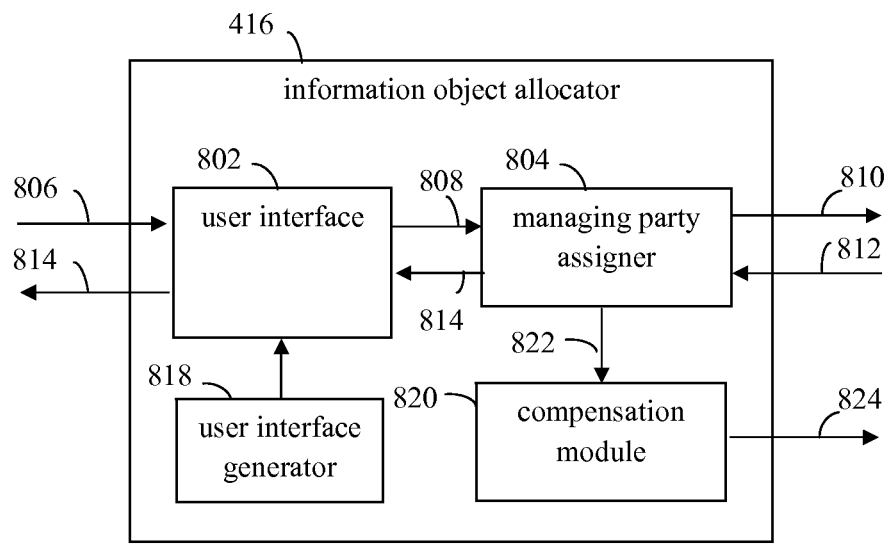
FIG. 8 shows a block diagram of an information object allocator, according to an example embodiment.

Information object allocator 416 shown in FIG. 4 may be configured in various ways to enable parties to obtain management of information objects for a time period (step 506 in FIG. 5) and to configure the associated communication channels to route requests to managing parties (step 508). For instance, FIG. 8 shows a block diagram of information object allocator 416, according to an example embodiment. In the embodiment of FIG. 8, parties are enabled to provide requests to manage information objects to information object allocator 416. As shown in FIG. 8, information object allocator 416 includes a user interface 802, a managing party assigner 804, a user interface generator 818, and a compensation module 820. These elements of information object allocator 416 are described as follows.

User interface 802 is generated by user interface generator 818, and is configured to enable parties to provide requests to manage information objects. For example, as shown in FIG. 8, user interface 802 may receive an object management request 806. Object management request 806 may be received from a party desiring to manage an information object. User interface 802 may provide any type of user interface to enable the party to input object management request 806, including a graphical user interface (GUI). As shown in FIG. 8, user interface 802 outputs a selected information object indication 808, which indicates an information object and time period received from the party in object management request 806. User interface generator 818 may be configured in any manner to generate user interface 802, as would be known to persons skilled in the relevant art(s). For example, user interface 802 may be generated as an HTML file or other type of file, which may be displayed at a computing device (e.g., advertiser/merchant device 406 of FIG. 4) of the requesting party.

Figure 9:
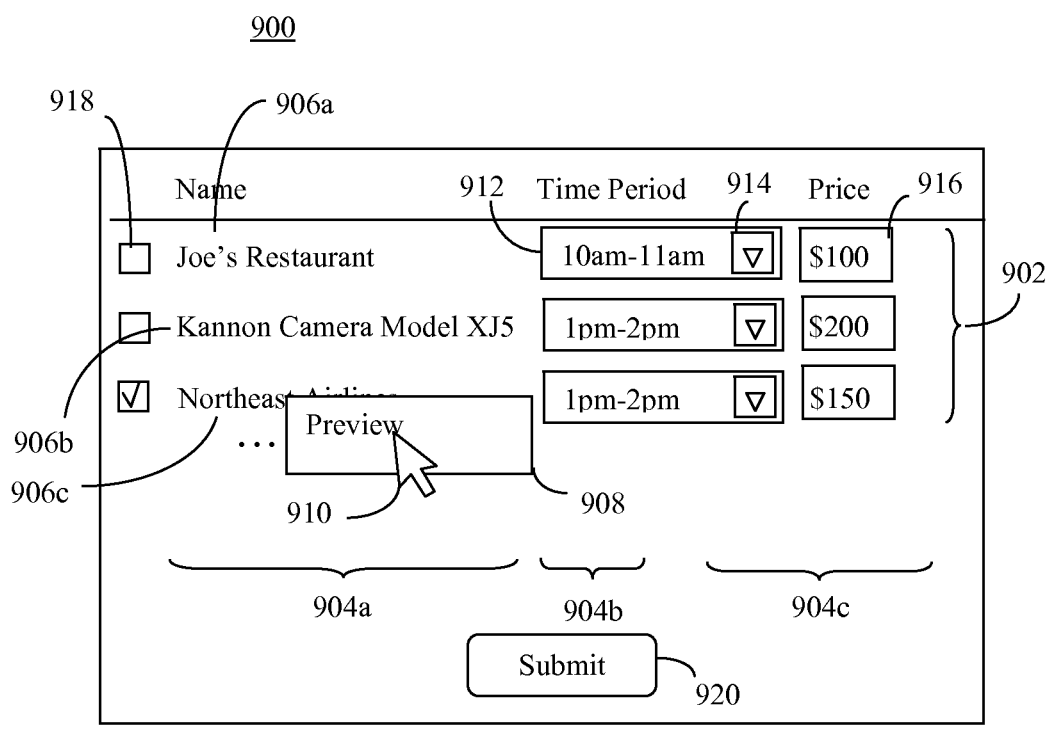
FIG. 9 shows a graphical user interface that may be used to request management of an information object, according to an example embodiment.

For instance, FIG. 9 shows a GUI 900, which is an example of user interface 802, according to an embodiment. A party may interact with GUI 900 to input object management request 806, to obtain management of an information object for a time period. For example, as shown in FIG. 9, the party may operate a pointer 910 (e.g., a computer mouse), and/or may use other mechanism (e.g., keystrokes, voice recognition, etc.), to enter object management request 806 into GUI 900.

In the example of FIG. 9, GUI 900 may display a list 902 of information objects, from which the party may select a particular information object to manage. As shown in the example of FIG. 9, list 902 lists three entries 906a-906c corresponding to three information objects (e.g., information objects 102a-102c of FIG. 4). Each entry 906 includes a name 906 of an information object, a time period selector 912, and a price indication 916. Each name 906 may be a name assigned to the corresponding information object in metadata 104. For instance, the name "Joe's Restaurant" is assigned to the information object of entry 906a, the name "Kannon Camera Model XJ5" is assigned to the information object of entry 906b, and the name "Northeast Airlines" is assigned to the information object of entry 906c. In an embodiment, as shown in FIG. 9, a party may use pointer 910 (e.g., by clicking on a selected information object with a right mouse button) to cause a menu 908 to appear for a selected information of object of interest. The menu may include a "Preview" selection, which may enable the party to preview the selected information object, if desired. The party may desire to preview the selected information object to aid in determining whether to input a request to manage the selected information object.

Each time period selector 912 indicates a time period for which the party has currently selected to manage the corresponding information object. In the example of FIG. 9, time period selector 912 is a pull down menu that enables the party to select a time period from a list of time periods. Additionally or alternatively, the party may be enabled to select a particular day, or multiple days, using time period selector 912 or other user interface in GUI 900. For instance, in FIG. 9, the time period "1 pm-2 pm" is shown selected for entry 906c. In an embodiment, time period selector 912 may provide predetermined time periods. In another embodiment, time period selector 912 may enable the party to configure the time periods to be of predetermined or variable lengths of time.

Each price indication 916 indicates a price that is due to the owner from a party if the party is enabled to manage the corresponding information object during the time period indicated by time period selector 912. Price indication 916 may be automatically filled with a price corresponding to the selected time period. For instance, the price $150 is indicated as the amount that would be due to the owner from a party assigned to manage the information object named "Northeast Airlines" from 1 pm-2 pm. Price $150 may have been predetermined by the owner as a desired amount of compensation for enabling a party to manage the information object for the indicated time period, for example.

Each entry 906 has a corresponding check box 918 that may be selected if the party accepts the displayed time period and price indicated for the information object. For instance, as shown in FIG. 9, the party has selected the check box adjacent to entry 906c. As such, the party is desiring to pay $150 to be provided with management of the "Northeast Airlines" information object for 1 pm-2 pm. A submit button 920 is shown in FIG. 9, which the party may select to submit the purchase for any information objects that are indicated as selected by check boxes 918.

Note that the number, form, and arrangement of user interface elements shown in FIG. 9 are provided for purposes of illustration, and are not intended to be limiting. Any number, form, and arrangement of user interface elements may be present in user interface 802 to enable a party to request management of information objects for corresponding time periods, as would be known to persons skilled in the relevant art(s).

As shown in FIG. 8, managing party assigner 804 receives selected information object indication 808. Based on selected information object indication 808, managing party assigner 804 may transmit an information object request 810 to data store 410 (FIG. 4) to request an information object 102 indicated as selected by the party in selected information object indication 808. Managing party assigner 804 receives the requested information object 102 in an information object response 812. Managing party assigner 804 is configured to assign a managing party identifier, including a communication address, for the requesting party (now managing party) to the received information object 102 (e.g., into managing party identifier 110 of FIG. 1). For instance, the communication address may include at least one of a uniform resource locator (URL), an email address, a chat address, or a text messaging address for the managing party. In this manner, the communication channel of the information object is configured to route to the party requests that are made by users that interact with the information object (e.g., according to step 508 in FIG. 5).

As shown in FIG. 8, managing party assigner 804 may transmit a configured information object 814 to user interface 802. Configured information object 814 includes the information object 102 modified to route communications to the managing party. The managing party may download configured information object 814 from user interface 802. In another embodiment, configured information object 814 may be transmitted from managing party assigner 804 directly to the managing party (e.g., without going through user interface 802). The managing party may position the received configured information object 814 to be made available to users, including positioning configured information object 814 on a web page. In still another embodiment, configured information object 814 may be transmitted from managing party assigner 804 directly to a location, such as a web page, to be made available to users. For example, managing party assigner 804 may transmit configured information object 814 to be posted on a web page to replace a prior version of configured information object 814 (e.g., that may have been configured to route communications to a prior managing party).

In an embodiment, as shown in FIG. 8, managing party assigner 804 may transmit a compensation request signal 822, which is received by compensation module 820. Compensation request signal 822 may indicate that a managing party has been assigned to a particular information object 102, and that as a result the owner of the information object 102 is due compensation from the managing party (e.g., according to the price indicated by price indication 916). Compensation module 820 may perform any suitable price calculations (e.g., taxes, etc.) as may be needed, and may generate a compensation signal 824. Compensation signal 824 may be a compensation instruction to the managing party (e.g., at one of advertiser/merchant devices 406), to indicate that the managing party needs to pay the owner the indicated amount. In another embodiment, compensation module 820 may enact a transfer of payment from an account of the managing party to an account of the owner, and compensation signal 824 may be a confirmation that such a transfer of payment was made.

Figure 10:
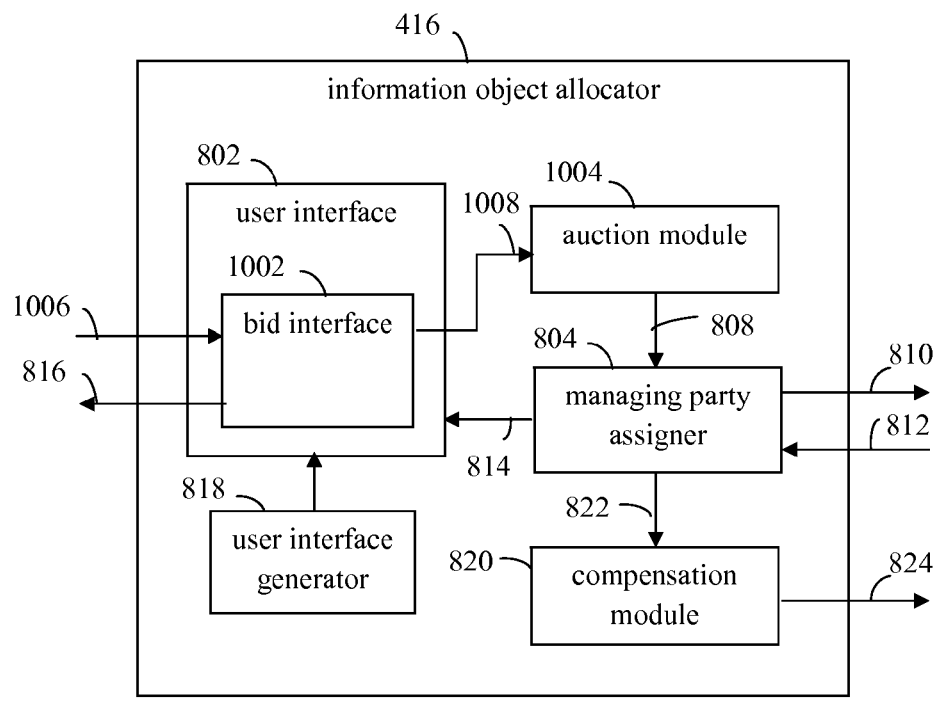
FIG. 10 shows a block diagram of an information object allocator, according to an example embodiment.
Figure 11:
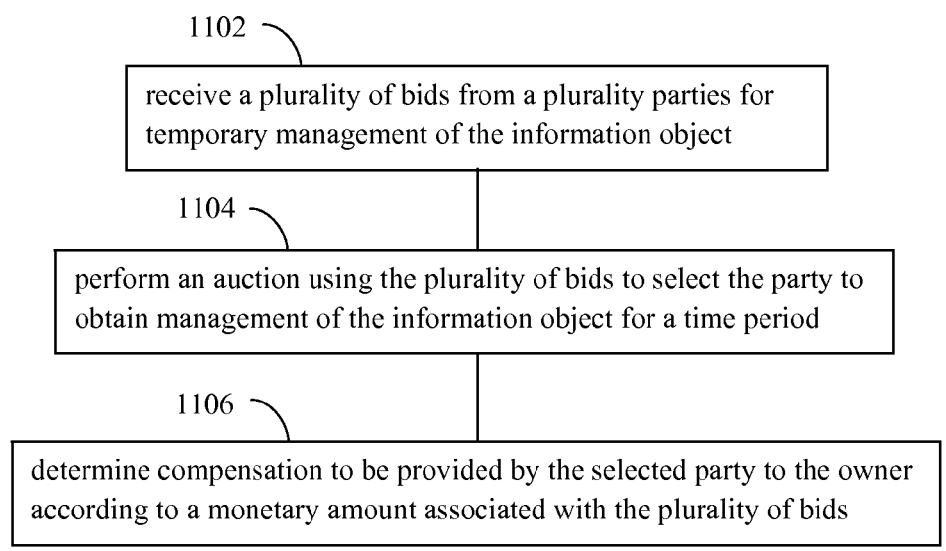
FIG. 11 shows a flowchart for assigning management of information objects according to an auction, according to an example embodiment.

FIG. 10 shows a block diagram of information object allocator 416, according to another example embodiment. In the embodiment of FIG. 10, parties are enabled to provide bids for managing information objects to information object allocator 416. An auction is performed on the bids, to select a "winning" bid, to enable the party submitting the winning bid to be assigned management of the information object. As shown in FIG. 10, information object allocator 416 includes user interface 802, managing party assigner 804, user interface generator 818, compensation module 820, and an auction module 1004. Furthermore, user interface 802 includes a bid interface 1002. Auction module 1004 is coupled between bid interface 1002 and managing party assigner 804. Information object allocator 416 of FIG. 10 is similar to information object allocator 416 shown in FIG. 8, with differences described as follows with respect to a flowchart 1100 shown in FIG. 11. Flowchart 1100 may be performed by information object allocator 416 of FIG. 10.

Referring to flowchart 1100, in step 1102, a plurality of bids is received from a plurality parties for temporary management of the information object. For instance, in an embodiment, the bids may be received at bid interface 1002. Bid interface 1002 is generated by user interface generator 818, and as shown in FIG. 10, receives a plurality of bid requests 1006. Each bid request of bid requests 1006 is received from a party, and is a bid for management of an information object. Any number of bids may be present in bid requests 1006, including tens, hundreds, thousands, and even greater number of bids.

In an embodiment, bid interface 1002 may be configured similarly to GUI 900 shown in FIG. 9, such that parties can select information objects to bid on (e.g., by checking the corresponding check box 918), can select the time period to bid on (e.g., by interacting with the corresponding time period selector 912), and can enter their bid amount (e.g., into the text box of price indicator 916). The party may then submit one or more bids entered in this manner by clicking on submit button 920. In alternative embodiments, bids may be entered in other ways, as would be known to persons skilled in the relevant art(s) from the teachings herein. As shown in FIG. 10, bid interface 1008 outputs a plurality of bids 1008.

In step 1104, an auction is performed using the plurality of bids to select the party to obtain management of the information object for a time period. For example, in an embodiment, auction module 1004 may perform the auction. As shown in FIG. 10, auction module 1004 receives plurality of bids 1008. Auction module 1004 may be configured to perform an auction using plurality of bids 1008 to select the party to obtain management of the information object for a time period. Auction module 1004 may be configured in various ways to perform the auction, based on bids for information objects that include bid amounts and time periods, as would be known to persons skilled in the relevant art(s). For example, for a particular information object, auction module 1004 may be configured to select a highest received bid of plurality of bids 1008 for an information object during a particular time period. In embodiments, auction module 1004 may be configured to perform an auction to optimize revenue generated according to plurality of bids 1008 across multiple time periods, which may be of standard or variable (overlapping or non-overlapping) lengths.

As shown in FIG. 10, auction module 1004 generates selected information object indication 808, which indicates a selected managing party for a particular information object based on plurality of bids 1008. Managing party assigner 804 receives selected information object indication 808, and may further operate as described above with respect to FIG. 8.

In step 1106, compensation to be provided by the selected party to the owner is determined according to a monetary amount associated with the plurality of bids. For example, as described above with respect to FIG. 8, compensation module 820 may determine and/or assign compensation.

IV. Example Computer Implementations

Object serving system 408, object builder module 414, information object allocator 416, attributes configuration module 602, communication channel configuration module 604, managing party assigner 804, user interface generator 818, compensation module 820, bid interface module 1002, and auction module 1004 may be implemented in hardware, software, firmware, or any combination thereof. For example, object serving system 408, object builder module 414, information object allocator 416, attributes configuration module 602, communication channel configuration module 604, managing party assigner 804, user interface generator 818, compensation module 820, bid interface module 1002, and/or auction module 1004 may be implemented as computer program code configured to be executed in one or more processors. Alternatively, object serving system 408, object builder module 414, information object allocator 416, attributes configuration module 602, communication channel configuration module 604, managing party assigner 804, user interface generator 818, compensation module 820, bid interface module 1002, and/or auction module 1004 may be implemented as hardware logic/electrical circuitry.

Figure 12:
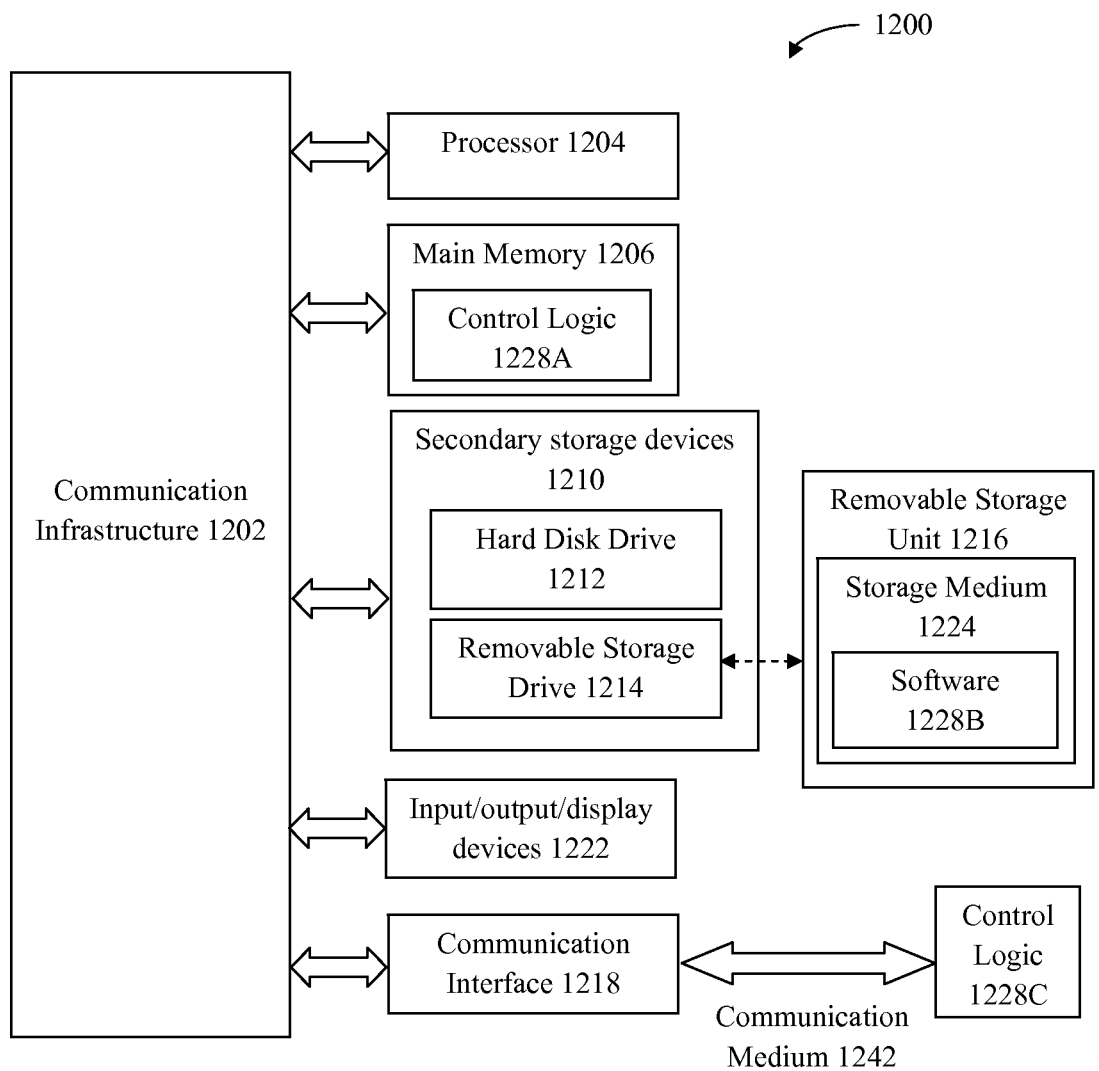
FIG. 12 shows a block diagram of an example computer system in which embodiments of the present invention may be implemented.

The embodiments described herein, including systems, methods/processes, and/or apparatuses, may be implemented using well known servers/computers, such as a computer 1200 shown in FIG. 12. For example, computer 302, user devices 402*a*-402*m*, advertiser/merchant devices 406*a*-406*o*, content servers 412*a*-412*n*, owner devices 418*a*-418*p*, and/or embodiments of object serving system 408 can be implemented using one or more computers 1200.

Computer 1200 can be any commercially available and well known computer capable of performing the functions described herein, such as computers available from International Business Machines, Apple, Sun, HP, Dell, Cray, etc. Computer 1200 may be any type of computer, including a desktop computer, a server, etc.

Computer 1200 includes one or more processors (also called central processing units, or CPUs), such as a processor 1204. Processor 1204 is connected to a communication infrastructure 1202, such as a communication bus. In some embodiments, processor 1204 can simultaneously operate multiple computing threads.

Computer 1200 also includes a primary or main memory 1206, such as random access memory (RAM). Main memory 1206 has stored therein control logic 1228A (computer software), and data.

Computer 1200 also includes one or more secondary storage devices 1210. Secondary storage devices 1210 include, for example, a hard disk drive 1212 and/or a removable storage device or drive 1214, as well as other types of storage devices, such as memory cards and memory sticks. For instance, computer 1200 may include an industry standard interface, such a universal serial bus (USB) interface for interfacing with devices such as a memory stick. Removable storage drive 1214 represents a floppy disk drive, a magnetic tape drive, a compact disk drive, an optical storage device, tape backup, etc.

Removable storage drive 1214 interacts with a removable storage unit 1216. Removable storage unit 1216 includes a computer useable or readable storage medium 1224 having stored therein computer software 1228B (control logic) and/or data. Removable storage unit 1216 represents a floppy disk, magnetic tape, compact disk, DVD, optical storage disk, or any other computer data storage device. Removable storage drive 1214 reads from and/or writes to removable storage unit 1216 in a well known manner.

Computer 1200 also includes input/output/display devices 1222, such as monitors, keyboards, pointing devices, etc.

Computer 1200 further includes a communication or network interface 1218. Communication interface 1218 enables the computer 1200 to communicate with remote devices. For example, communication interface 1218 allows computer 1200 to communicate over communication networks or mediums 1242 (representing a form of a computer useable or readable medium), such as LANs, WANs, the Internet, etc. Network interface 1218 may interface with remote sites or networks via wired or wireless connections.

Control logic 1228C may be transmitted to and from computer 1200 via the communication medium 1242.

Any apparatus or manufacture comprising a computer useable or readable medium having control logic (software) stored therein is referred to herein as a computer program product or program storage device. This includes, but is not limited to, computer 1200, main memory 1206, secondary storage devices 1210, and removable storage unit 1216. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for object serving system 408, object builder module 414, information object allocator 416, attributes configuration module 602, communication channel configuration module 604, managing party assigner 804, user interface generator 818, compensation module 820, bid interface module 1002, auction module 1004, flowchart 500, and/or flowchart 1100 (including any one or more steps of flowcharts 500 and 1100), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

V. Conclusion

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method implemented on a machine having at least one processor, storage, and a communication platform connected to a network for managing online communications related to an information object, comprising:
    creating an information object corresponding to a product associated with an owner;
    selecting, through a bidding process directed to a plurality of managers, a manager from the plurality of managers for handling requests from one or more online users regarding the product during a specific time period;
    dynamically configuring the information object based on the bidding result so that requests from the one or more online users are to be directed to the selected manager;
    dynamically creating a communication channel and an interface thereof associated with the information object and designated for communications with regard to the product between the one or more online users and the selected manager during the specific time period;
    transmitting the configured information object and the communication channel with the interface thereof to a publisher so that the configured information object and the interface for the communication channel can be displayed on a web page hosted by the publisher, wherein when one of the one or more online users visiting the web page activates the configured information object, the interface of the communication channel is to be used to facilitate the communications between the online user and the manager during the specific time period; and
    automatically routing the online user to an additional web page that is associated with the manager and provides additional information about potential transactions of the product, upon an activation of a link in the configured information object on the web page by the online user during the time period.

2. The method of claim 1, further comprising:
    determining, based on the bidding process, compensation to be provided by the manager to the owner for management of the information object during the specific time period; and
    sending an instruction to the manager for instructing the manager to pay the compensation to the owner.

3. The method of claim 1, wherein selecting the manager further comprises:
    receiving a plurality of bids from the plurality of managers for management of the information object during the specific time, wherein the plurality of bids includes a bid from the manager; and
    determining the manager for managing the information object during the specific time period, based on the plurality of bids.

4. The method of claim 3, wherein the bid from the manager either is highest among the plurality of bids or is earliest among the plurality of bids and higher than a threshold determined by the owner.

5. The method of claim 1, wherein dynamically creating the communication channel comprises:
    associating, with the information object, at least one of a uniform resource locator (URL), an email address, a chat address, or a text messaging address associated with the manager.

6. The method of claim 1, further comprising:
    selecting, through a second bidding process directed to the plurality of managers, a second manager from the plurality of managers for handling requests from the one or more online users regarding the product during a second time period subsequent to the specific time period; and
    dynamically configuring the communication channel to be designated for communications with regard to the product between the one or more online users and the second manager during the second time period.

7. A system having at least one processor, storage, and a communication platform connected to a network for managing online communications related to an information object, comprising:

an attributes configuration module configured for creating an information object corresponding to a product associated with an owner;

an information object allocator configured for
- selecting, through a bidding process directed to a plurality of managers, a manager from the plurality of managers for handling requests from one or more online users regarding the product during a specific time period, and
- dynamically configuring the information object based on the bidding result so that requests from the one or more online users are to be directed to the selected manager; and a communication channel configuration module configured for
- dynamically creating a communication channel and an interface thereof associated with the information object and designated for communications with regard to the product between the one or more online users and the selected manager during the specific time period,
- transmitting the configured information object and the communication channel with the interface thereof to a publisher so that the configured information object and the interface for the communication channel can be displayed on a web page hosted by the publisher, wherein when one of the one or more online users visiting the web page activates the configured information object, the interface of the communication channel is to be used to facilitate the communications between the online user and the manager during the specific time period, and
- automatically routing the online user to an additional web page that is associated with the manager and provides additional information about potential transactions of the product, upon an activation of a link in the configured information object on the web page by the online user during the time period.

8. The system of claim 7, wherein the information object allocator further comprises a compensation module configured for:
- determining, based on the bidding process, compensation to be provided by the manager to the owner for management of the information object during the specific time period; and
- sending an instruction to the manager for instructing the manager to pay the compensation to the owner.

9. The system of claim 7, wherein the information object allocator further comprises an auction module configured for:
- receiving a plurality of bids from the plurality of managers for management of the information object during the specific time, wherein the plurality of bids includes a bid from the manager; and
- determining the manager for managing the information object during the specific time period, based on the plurality of bids.

10. The system of claim 9, wherein the bid from the manager either is highest among the plurality of bids or is earliest among the plurality of bids and higher than a threshold determined by the owner.

11. The system of claim 7, wherein dynamically creating the communication channel comprises:
- associating, with the information object, at least one of a URL, an email address, a chat address, or a text messaging address associated with the manager.

12. A machine-readable tangible and non-transitory medium having information for managing online communications related to an information object, wherein the information, when read by the machine, causes the machine to perform the following:
- creating an information object corresponding to a product associated with an owner;
- selecting, through a bidding process directed to a plurality of managers, a manager from the plurality of managers for handling requests from one or more online users regarding the product during a specific time period;
- dynamically configuring the information object based on the bidding result so that requests from the one or more online users are to be directed to the selected manager;
- dynamically creating a communication channel and an interface thereof associated with the information object and designated for communications with regard to the product between the one or more online users and the selected manager during the specific time period;
- transmitting the configured information object and the communication channel with the interface thereof to a publisher so that the configured information object and the interface for the communication channel can be displayed on a web page hosted by the publisher, wherein when one of the one or more online users visiting the web page activates the configured information object, the interface of the communication channel is to be used to facilitate the communications between the online user and the manager during the specific time period; and
- automatically routing the online user to an additional web page that is associated with the manager and provides additional information about potential transactions of the product, upon an activation of a link in the configured information object on the web page by the online user during the time period.

13. The medium of claim 12, wherein the information, when read by the machine, further causes the machine to perform the following:
- determining, based on the bidding process, compensation to be provided by the manager to the owner for management of the information object during the specific time period; and
- sending an instruction to the manager for instructing the manager to pay the compensation to the owner.

* * * * *